(12) United States Patent
Xi et al.

(10) Patent No.: US 11,335,027 B2
(45) Date of Patent: May 17, 2022

(54) GENERATING SPATIAL GRADIENT MAPS FOR A PERSON IN AN IMAGE

(71) Applicants: Hewlett-Packard Development Company, L.P., Spring, TX (US); PURDUE RESEARCH FOUNDATION, Lafayette, IN (US)

(72) Inventors: Weijuan Xi, Palo Alto, CA (US); Qian Lin, Palo Alto, CA (US); Jan Phillip Allebach, West Lafayette, IN (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/049,316

(22) PCT Filed: Sep. 28, 2018

(86) PCT No.: PCT/US2018/053325
§ 371 (c)(1),
(2) Date: Oct. 20, 2020

(87) PCT Pub. No.: WO2020/068104
PCT Pub. Date: Apr. 2, 2020

(65) Prior Publication Data
US 2021/0074018 A1    Mar. 11, 2021

(51) Int. Cl.
*G06T 7/73*    (2017.01)
*G06T 7/143*    (2017.01)
*G06T 7/77*    (2017.01)
*G06V 40/16*    (2022.01)

(52) U.S. Cl.
CPC ............... *G06T 7/74* (2017.01); *G06T 7/143* (2017.01); *G06T 7/77* (2017.01); *G06V 40/162* (2022.01); *G06V 40/165* (2022.01); *G06T 2207/10024* (2013.01); *G06T 2207/20081* (2013.01);
(Continued)

(58) Field of Classification Search
CPC .. G06T 7/74; G06T 7/143; G06T 7/77; G06T 2207/10024; G06T 2207/20081; G06T 2207/20084; G06T 2207/30196; G06T 7/194; G06T 7/11; G06K 9/00234; G06K 9/00248; G06K 9/4628; G06K 9/00228; G06K 9/00369; G06K 9/6274
See application file for complete search history.

(56) References Cited

U.S. PATENT DOCUMENTS 9,098,740 B2    8/2015    Yoo et al.
9,786,084 B1    10/2017    Bhat et al.
9,916,538 B2    3/2018    Zadeh et al.
(Continued)

*Primary Examiner* — Phuoc Tran
(74) *Attorney, Agent, or Firm* — Fabian VanCott

(57) ABSTRACT

In one example in accordance with the present disclosure, a system is described. The system includes a pose estimator to identify a plurality of anatomical points on a person depicted in an image. A frame former of the system generates a frame for the person by connecting a first set of the plurality of anatomical points to form a skeleton and forming at least a head region and a torso region of the person based on a second set of the plurality of anatomical points. A map generator of the system generates a spatial gradient map projecting outwards from the frame. In the system, the spatial gradient map is based on pixel distance from the frame and an intensity along the gradient map indicates a pixels likelihood of form a part of the person.

20 Claims, 14 Drawing Sheets

(52) U.S. Cl.
CPC ............... *G06T 2207/20084* (2013.01); *G06T 2207/30196* (2013.01)

(56) References Cited

U.S. PATENT DOCUMENTS

| | | |
|---|---|---|
| 9,953,217 B2 | 4/2018 | Feris et al. |
| 9,978,003 B2 | 5/2018 | Sachs et al. |
| 2004/0227761 A1* | 11/2004 | Anderson ............... G06T 13/40 345/473 |
| 2009/0252423 A1 | 10/2009 | Zhu |
| 2010/0111370 A1 | 5/2010 | Black |
| 2010/0189313 A1 | 7/2010 | Prokoski |
| 2014/0228123 A1 | 8/2014 | Polzin |
| 2016/0370854 A1 | 12/2016 | Steele |
| 2017/0039720 A1 | 2/2017 | Yoo |
| 2018/0005343 A1 | 1/2018 | Rhoads et al. |
| 2018/0032844 A1 | 2/2018 | Yao et al. |
| 2018/0122098 A1 | 5/2018 | Wang et al. |
| 2019/0347826 A1* | 11/2019 | Zhang ................. G06K 9/4604 |

\* cited by examiner

GENERATING SPATIAL GRADIENT MAPS FOR A PERSON IN AN IMAGE

BACKGROUND

Image segmentation refers to the process of separating out different visual components from an image or video. For example, an image may represent a person posing in front of a building or a landscape. In this example, segmentation may be the process of separating the pixels of the image that make up the person from those that make up the building, landscape, or other background scene.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
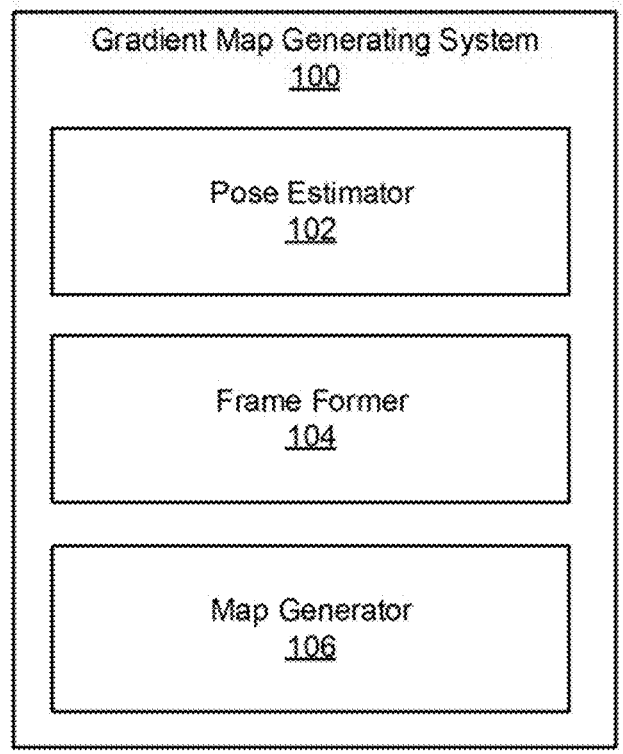
FIG. 1 is a block diagram of a system for a generating spatial gradient map for a person in an image, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Segmentation of an image is a pixel-wise classification of an image into a set of multiple objects. That is, the process of associating each pixel in an image with an object. For example, an image may be of a person standing in front of a landscape. Segmentation may classify each pixel in this image as either pertaining to the person or not. Segmentation may be even more refined by classifying each pixel in the image as pertaining to the person, or pertaining to particular objects in the landscape.

Such segmentation is used in various applications. For example a background of an image may be replaced with another. Similarly, the person in the image may be removed from the image and placed over another background.

In another example, the different objects of an image may be processed differently to create different aesthetic effects. For example, a color background may be converted to grayscale while the person remains in full color, thus creating an aesthetic effect that highlights the person. In another example, the background may be blurred while the person remains in focus, again highlighting the person in the image. While specific reference has been made to altering the pixel characteristics of the background while maintaining the pixel characteristics of the person, the alternative may be carried out with the person stylized and the background maintained the same. In other words, segmentation allows for the individual manipulation of image objects without affecting other image objects and thus provides a valuable tool in more effectively manipulating images and/or videos.

While specific reference is made to particular types of image processing that rely on segmentation, other applications may use segmentation as well such as augmented reality applications, video surveillance applications, and telecommunication applications.

While segmentation does provide additional image/video processing capabilities; segmentation, and specifically person segmentation, can be a complicated process. One specific example is the variation present in images and videos. For example, no two images include users in the same poses and dress. Different dress and poses can complicate the separation of the person from the background. For example, some segmentation operations rely on a similarity in pixel color. However, if a background has a similar color to a person's shirt, this background may inadvertently be segmented along with the person. Moreover, the variation between person poses makes the distinction between a person and the background quite difficult.

Accordingly, the present specification describes the generation of a gradient map that provides additional information relied on by a segmentation system to separate the person from the background. The additional information is a spatial gradient map around a person and allows for a highly accurate automatic person segmentation method.

Specifically, the present system generates a map that is based on a detected pose for a user. That is, an image is analyzed and anatomical points are extracted for a person in the image. From these anatomical points, a frame for the person is identified. A gradient map is then formed that extends outwards from the frame. In the spatial gradient map, the pixels that are closer to the frame are more likely to form part of the person. This gradient map, when used in person segmentation conjunction with other information can be used to exclude or include certain pixels from the set that is used to define the person in the figure. For example, assume a group of pixels is identified as being similar enough to person-related pixels (for example a similar color) such that the group is initially classified as pertaining to the person. However, such a group of pixels is outside the range identified by the gradient map. Accordingly, this group of pixels would be excluded from the set that is used to define the person. In other words, the spatial gradient map provides more information to enhance person segmentation.

Specifically, the present specification describes a system. The system includes a pose estimator to identify a plurality of anatomical points on a person depicted in an image. A frame former of the system generates a frame for the person by 1) connecting a first set of the plurality of anatomical points to form a skeleton and 2) forming at least a head region and a torso region based on a second set of the plurality of anatomical points. A map generator of the system generates a spatial gradient map projecting outwards from the frame. In this example, the spatial gradient map is based on pixel distance from the frame and an intensity along the gradient map indicates a likelihood that a pixel forms a part of the person.

The present specification also describes a method. According to the method, a plurality of anatomical points are identified on a person depicted in an image. A frame for the person is formed by 1) connecting a first set of the plurality of anatomical points to form a skeleton, 2) forming a head region of the person based on a distance between certain anatomical points on the person, and 3) forming a torso region of the person by connecting shoulder anatomical points and hip anatomical points on the person. A spatial gradient map which projects outward from the frame is then generated. The spatial gradient map is based on pixel distance from the frame.

The present specification also describes a system. In this example, the system includes a pose estimator as described above. The frame former in this example 1) connects a first set of the plurality of anatomical points to form a skeleton; 2) forms a head region based on a distance between certain anatomical points on the person; 3) forms a torso region by connecting shoulder anatomical points and hip anatomical points on the person; and 4) assigns pixels that map to the frame with a first value. A map generator of the system generates a spatial gradient map that projects outwards from the frame by, for each non-frame pixel within a threshold distance from the frame: 1) determining a distance from the frame and 2) based on the distance, assigning a value between the first value and a second value assigned to pixels of non-frame portions of the image. A segmentation device of the system, using the spatial gradient map and other image information, separates the person in the image from other portions of the image.

In summary, using such a spatial gradient map generating system 1) provides a map from which a highly accurate person segmentation operation can be carried out; 2) generates the map based on actual pose information collected from the image; and 3) reduces segmentation error.

Turning now to the figures, FIG. 1 is a block diagram of a system (100) for generating a spatial gradient map of a person in an image, according to an example of the principles described herein. As described above, a spatial gradient map includes information that can be used by a segmentation system to either include or exclude certain pixels of an image from being classified as pertaining to a person in the image. That is, the spatial gradient map increases the accuracy of segmentation results.

In general, the spatial gradient map identifies those locations of an image that are more likely to correspond to a person, and not to a background. Accordingly, the system (100) first generates a rough frame for the person in the image. A pose estimator (102) of the system (100) identifies a plurality of anatomical points on a person in the image. These anatomical points serve as nodes for generating a skeleton of the person. For example, the anatomical points include facial points that are used to define in part a head region of the frame. Other anatomical points such as joints throughout the body are used to create a skeleton.

Figure 3A:
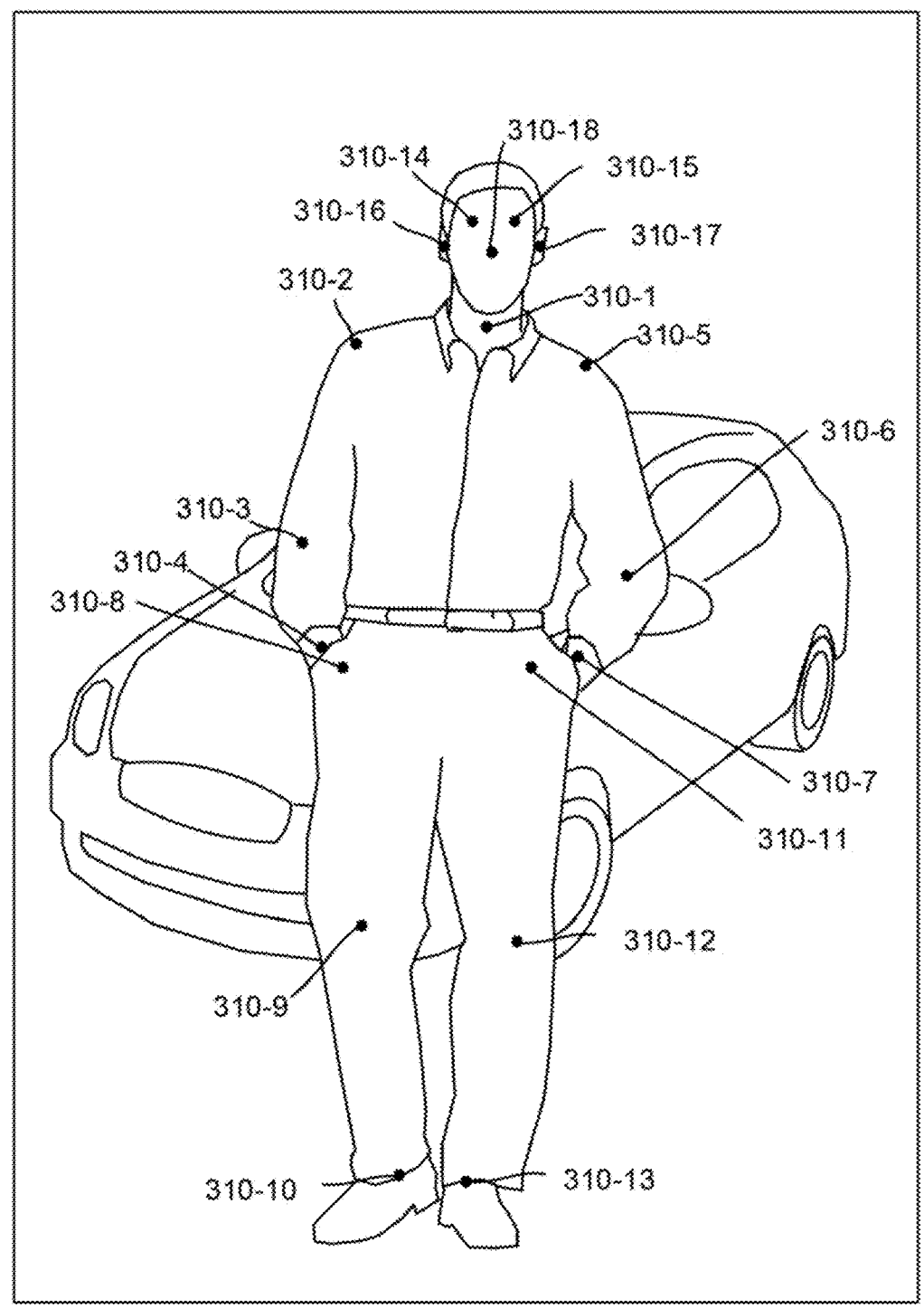
FIGS. 3A-3F depict the generation of a spatial gradient map for a person in an image, according to an example of the principles described herein.

The pose estimator (102) therefore analyzes an image to identify such anatomical points, i.e., facial features and joints, on a person. In one example, the pose estimator (102) is a machine-learning pose estimator (102) that identifies the plurality of anatomical points based on a training set of images. That is, the pose estimator (102) may be a pre-trained deep neural network model that outputs the position of the anatomical points and their association. Both of these outputs reflect a pose of the person in the image. FIG. 3A depicts an image of a person following operation of the pose estimator (102) to determine the anatomical points on the person.

Figure 3B:
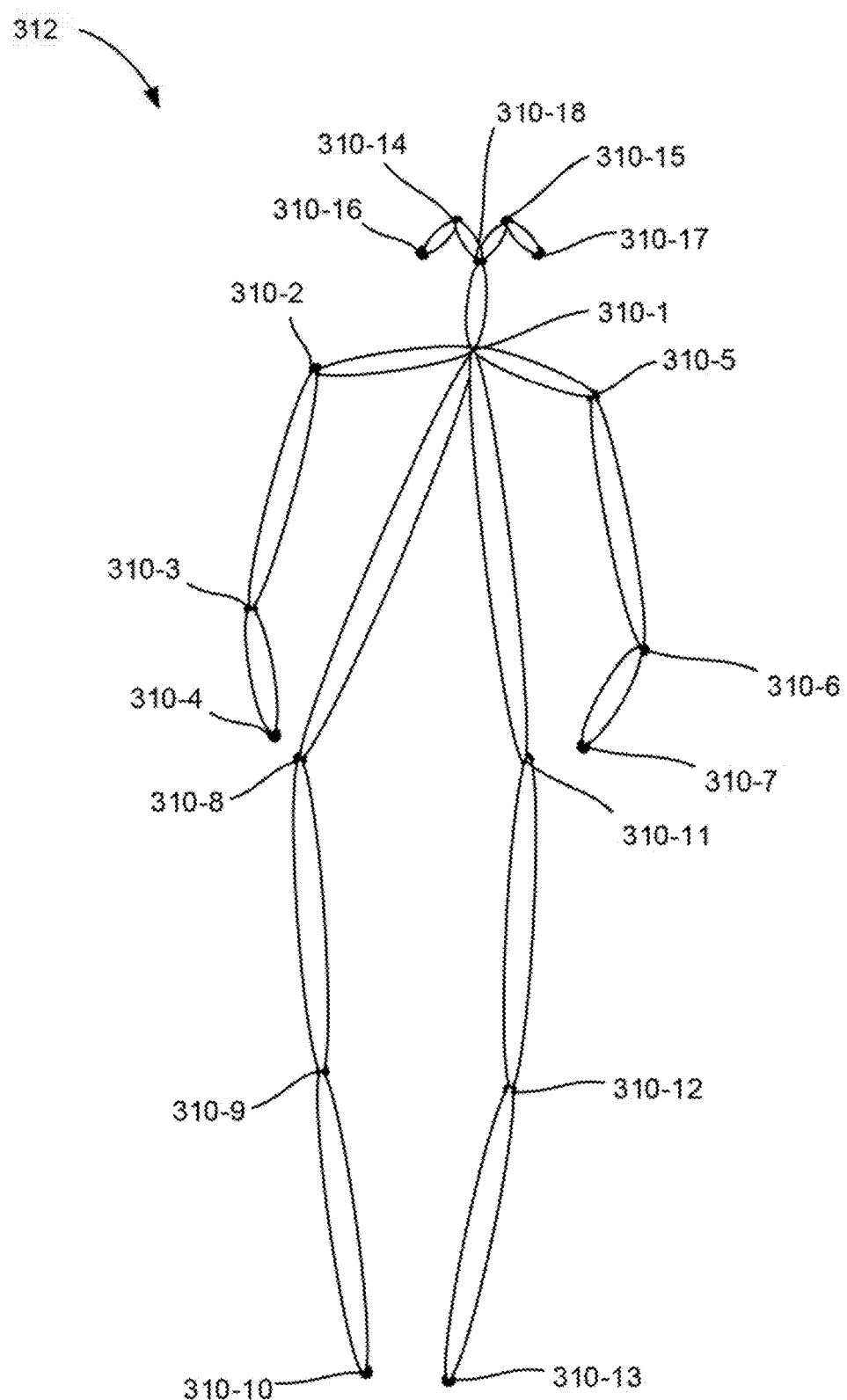

A frame former (104) of the system (100) joins certain of the anatomical points to form a frame. Specifically, pairs of certain adjacent anatomical points can be joined to form a skeleton. For example, a wrist anatomical point and an elbow anatomical point can be joined to one another to form a forearm region of the skeleton. FIG. 3B depicts an example of a skeleton formed by joining a first set of anatomical points.

Figure 4:
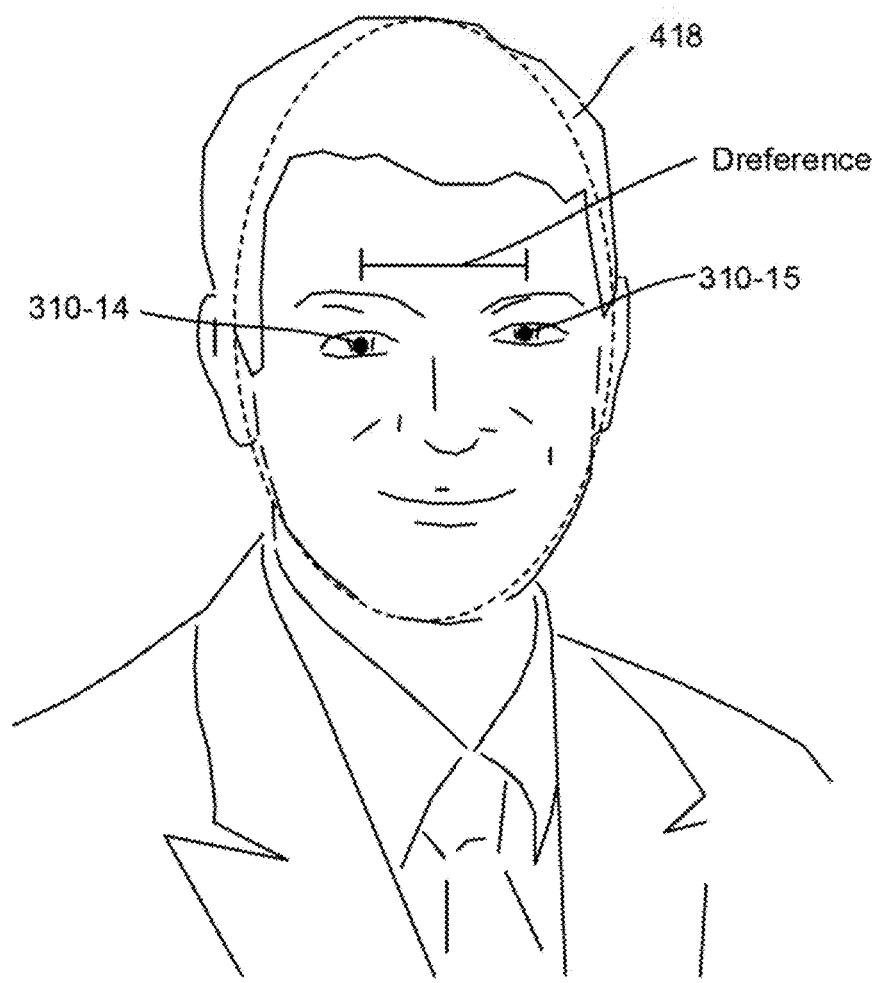
FIG. 4 depicts the formation of a front-facing head region of the frame, according to an example of the principles described herein.
Figure 5:
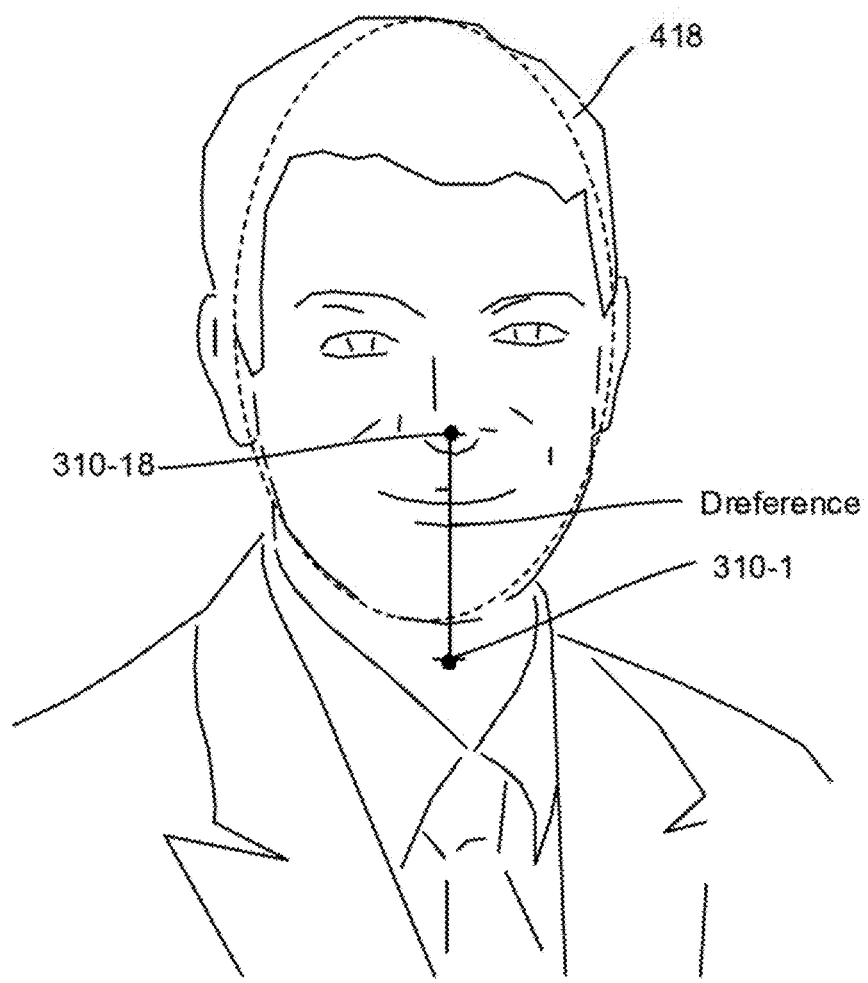
FIG. 5 depicts the formation of a front-facing head region of the frame, according to another example of the principles described herein.

Other regions of the frame may be similarly formed by joining other anatomical points. For example, shoulder anatomical points may be joined with hip anatomical points to form a polygon representative of a torso region of the person. The frame former (104) also identifies a head region for the frame based on certain anatomical points. The anatomical points that are relied on to define the head region depend on an angle of the head. For example, if based on the detection of eye anatomical points it is determined that the person is forward-facing, a distance between eye anatomical points or a distance between a nose anatomical point and a neck anatomical point can be used to define an oval representative of a head region of the frame. FIGS. 4 and 5 depict examples of a head region formed for a forward-facing head.

Figure 6:
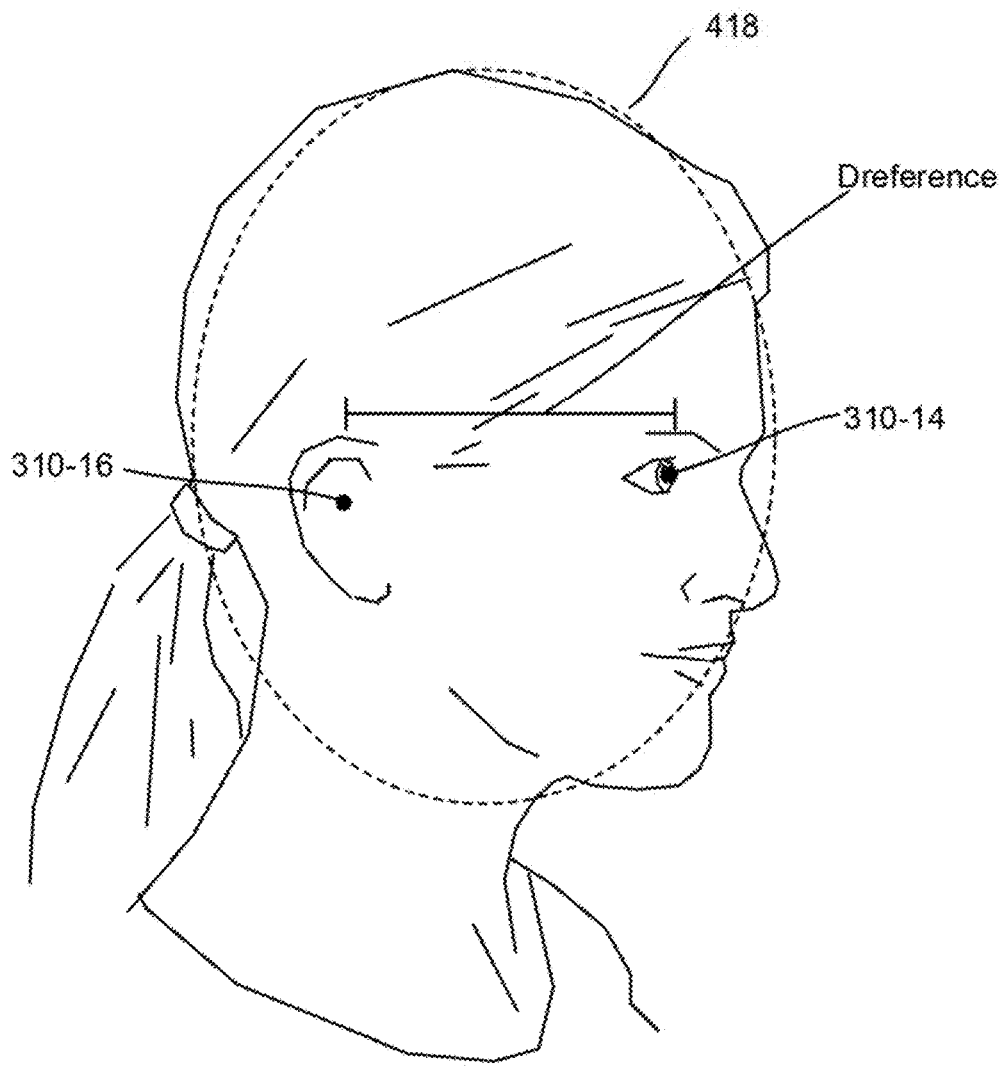
FIG. 6 depicts the formation of a side-facing head region of the frame, according to an example of the principles described herein.

By comparison, if based on the detection of eye anatomical points and other facial points, it is determined that the person is side-facing, a distance between an eye point and an ear point may be used to define the oval that is representative of the head region of the frame. FIG. 6 depicts an example of a head region formed for a side-facing head.

Figure 3C:
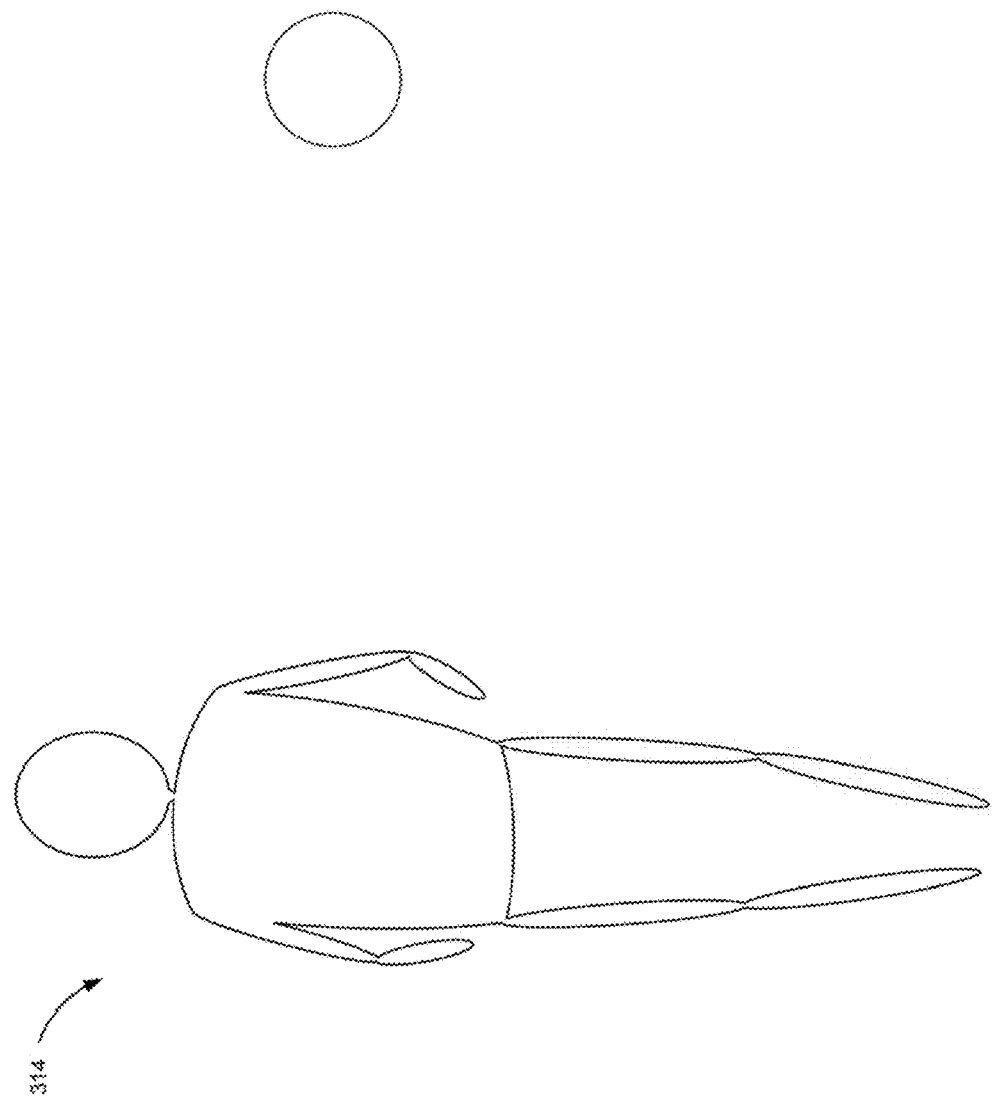

Accordingly, by forming the skeleton by joining certain anatomical points, forming the torso region by joining other anatomical points, and forming the head region by creating an oval based on a distance between certain anatomical points, the frame former (104) generates a frame, regardless of a pose of the person. The generated frame represents a rough outline of the person, or an indication of the pixels that roughly correspond to the person in the image. FIG. 3C depicts an example of a frame formed by joining various anatomical points.

Figure 3D:
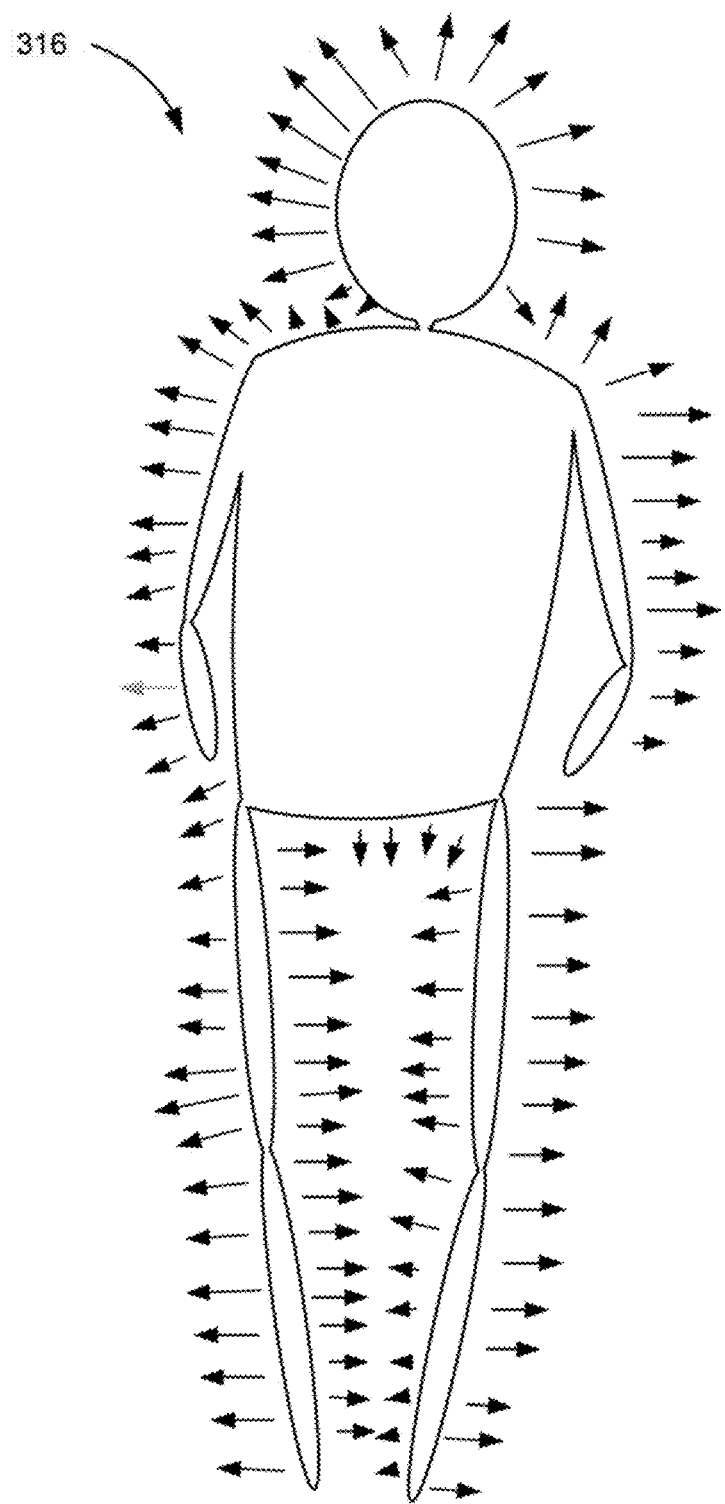
Figure 3E:
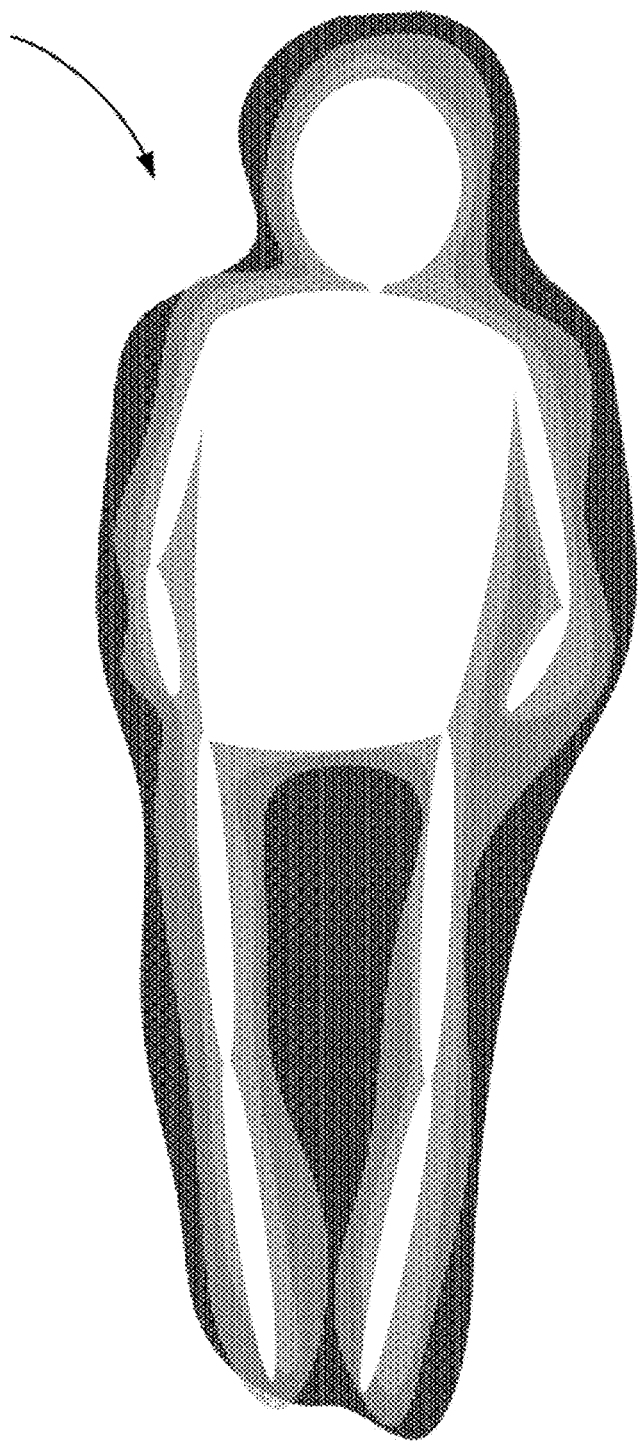
Figure 3F:
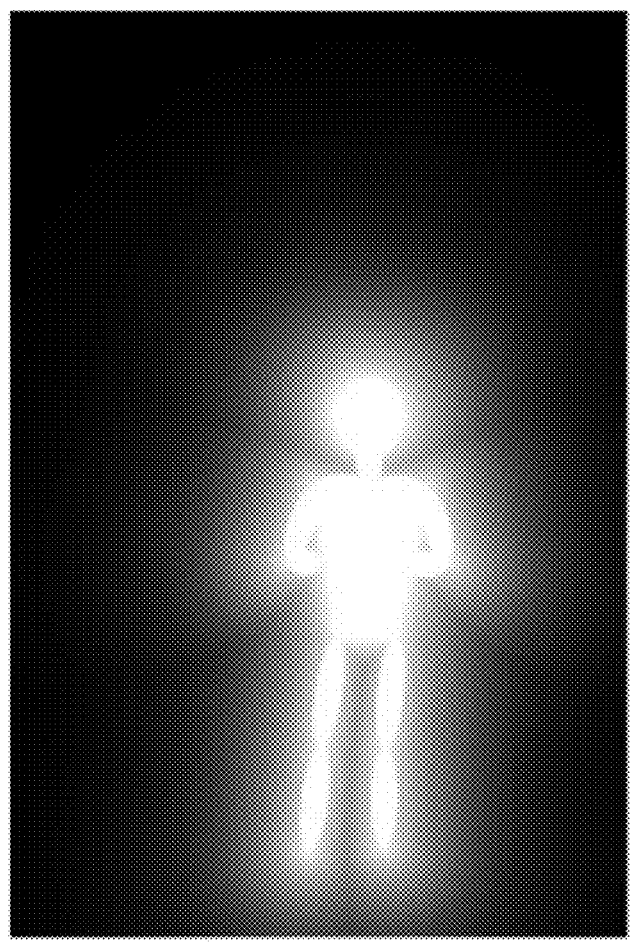

The map generator (106) generates a spatial gradient map projecting outward from the frame. This map defines those regions most likely to correspond to the person of the image. The spatial gradient map is based on a pixel distance from the frame. That is, as a general rule, those pixels that are closest to the frame, i.e., the rough estimation of the person portion of the image, are more likely to be part of the person portion of the image than those pixels that are farther from the frame. Such a likelihood is represented via a spatial gradient map extending away from the frame with the intensity along the spatial gradient map indicating the likelihood that a particular pixel is part of the person portion of the image. FIGS. 3D-3F depict examples of a spatial gradient map.

The likelihood conveyed by the spatial gradient map provides additional information regarding person segmentation. That is, a person segmentation system, using other data may generate an estimation of what portions of an image pertain to a person. For example, a segmentation system may rely on various channels, which may be R, G, and B color channels, to distinguish a person in an image from the rest of the image. However, due to limitations of those segmentation systems, parts of the image maybe incorrectly identified as pertaining to the person and other parts may be incorrectly identified as not pertaining to the person. For example, certain pixels a distance away from the person may be segmented along with the person due to a similarity in pixel values. However, using the spatial gradient map, these outlier pixels may be excluded for segmentation with the person based on the spatial gradient map identifying them as far enough away from the frame that they are not likely a part of the person.

By comparison, certain pixels that in actuality form part of the person portion of the image may be incorrectly segmented along with a background portion of the image for any number of reasons, including similarity between pixel values for the incorrectly segmented person pixels and the background pixels. In this example, using the spatial gradient map, these incorrectly classified pixels may be included as part of the person portion of the figure as they may be close to the frame such that it is likely they form part of the person. That is, since the values in the spatial gradient map express a probability of a pixel belonging to a person class, the spatial gradient map reflects the approximate position of each person and the gradient values provide more spatial information to improve segmentation.

Accordingly, the system (100) provides additional data points that can be used to refine the results of a person segmentation operation, thus providing more accurate segmentation results which improves subsequent computer processing of the segmented image.

Figure 2:
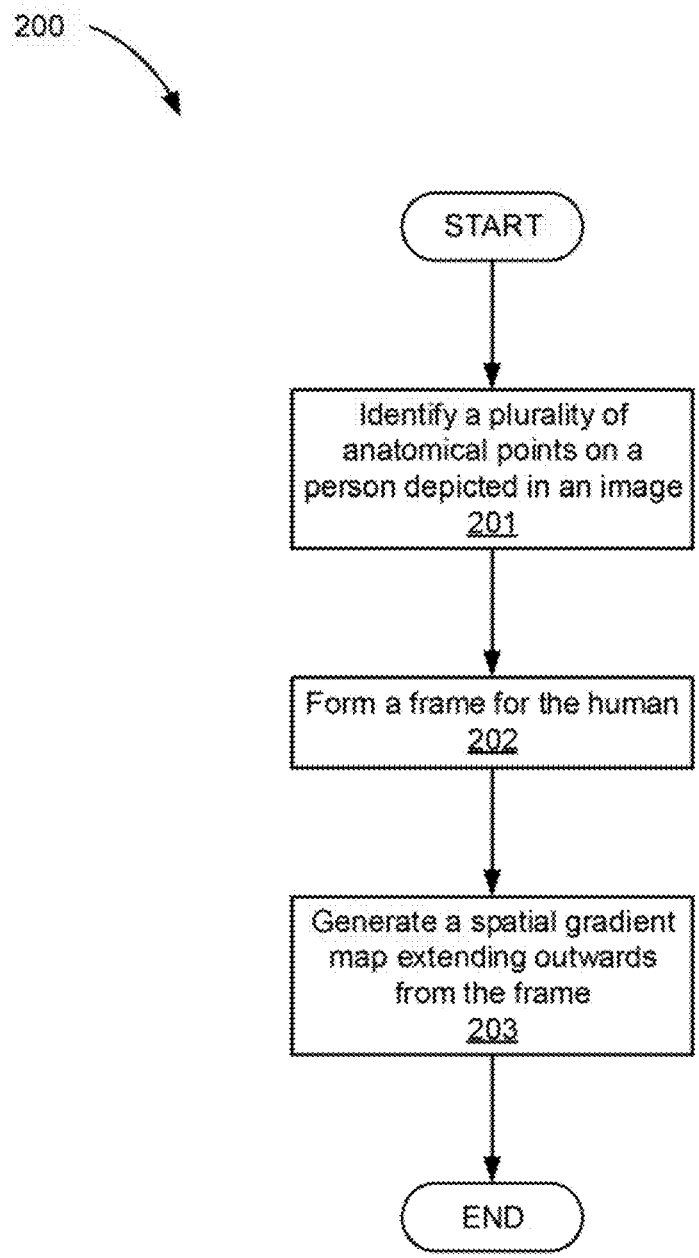
FIG. 2 is a flow chart of a method for generating a spatial gradient map for a person in an image, according to an example of the principles described herein.

FIG. 2 is a flow chart of a method (200) for generating a spatial gradient map for a person in an image, according to an example of the principles described herein. As described above, the spatial gradient map indicates, for various pixels, a likelihood that the pixel forms part of a person portion of the image. Accordingly, the method (200) identifies a rough estimate of the person and then identifies additional locations on the image that are likely to contain pixels that correspond to the person in the image.

According to the method (200), a plurality of anatomical points for a person depicted in an image are identified (block 201). These anatomical points may relate to facial features for the person as well as body joint features for the person. That is, the spatial gradient map is a map not only of the upper regions, or portrait, of a person, but can encompass the entire body of the person. In this example, the pose estimator (FIG. 1, 102) may use a convolution neural network to calculate the anatomical points of a person. In some examples, up to 18 anatomical points may be detected for a person with a part-to-part association. In some examples, the pose estimator may work in real-time. That is, in addition to identifying anatomical points on still images, the pose estimator (FIG. 1, 102) may identify anatomical points on moving images, such as videos, thus enabling person segmentation not only on still images but also video clips.

A frame for the person is then formed (block 202). Forming the frame includes a variety of operations. For example, a skeleton is created by connecting certain adjacent anatomical points. A head region and torso region for the person may be defined as well to form (block 202) a part of the frame. For example, shoulder points and hip points can be joined to form a torso region and facial feature points may be used to define an oval head region. With the skeleton, head region, and torso region defined and formed, a rough estimate of those pixels of an image that correspond to a person are identified. However, as described above, such a frame is merely a rough estimation. Accordingly, the method (200) includes generating (block 203) a spatial gradient map that projects outward from the frame. The spatial gradient map is based on pixel distance away from the frame and may be identified via an intensity of color. For example, the spatial gradient map may be grayscale with higher probability pixels being more intense and lower probability pixels being less intense. That is, those pixels closest to the frame are more intense while those pixels that are farther away from the frame are less intense. As with the pose estimator (FIG. 1, 102), the frame former (FIG. 1, 104) and map generator (FIG. 1, 106) may operate in real-time on video frames in addition to, or instead of, operating just on still images.

The spatial gradient map may have a threshold, which threshold is a distance to which the gradient extends away from the frame. The gradient map determines, within this distance, which pixels are most likely to form part of the person. The distance of the spatial gradient map reflects a desired quality of the segmentation. In some examples, the threshold distance may be defined by the distance between facial features used to define the head region. An example is provided below in connection with FIGS. 3D-3F. Accordingly, the present method (200) provides a spatial gradient map that can be used to enhance person segmentation results.

FIGS. 3A-3E depict the generation of a spatial gradient map for person in an image, according to an example of the principles described herein. Specifically, FIG. 3A depicts the identification, by the pose estimator (FIG. 1, 102), of anatomical points (310). That is, as described above the system (FIG. 1, 100) may receive an image (308) 1) formed of various pixels and 2) that depicts a person. Via a convolutional neural network or other mechanism, the pose estimator (FIG. 1, 102) identifies various anatomical points (310) pertaining to locations on a person that can be used to form a frame. For example, a neck anatomical point (310-1), a right shoulder anatomical point (310-2), a right elbow anatomical point (310-3), a right wrist anatomical point (310-4), a left shoulder anatomical point (310-5), a left elbow anatomical point (310-6), a left wrist anatomical point (310-7), a right hip anatomical point (310-8), a right knee anatomical point (310-9), a right ankle anatomical point (310-10), a left hip anatomical point (310-11), a left knee anatomical point (310-12), and a left ankle (310-13) may be identified as body joint features. Similarly, a right eye anatomical point (310-14), left eye anatomical point (310-15), right ear anatomical point (310-16), left ear anatomical point (310-17), and a nose anatomical point (310-18) may be anatomical points corresponding to facial features.

These anatomical points (310) can be used to form a skeleton (312) as depicted in FIG. 3B. That is, particular anatomical points (310) are joined to form the skeleton (312). For example, as depicted in FIG. 3B, shoulder anatomical points (310-2, 310-5) can be joined to respective elbow anatomical points (310-3, 310-6) and respective wrist anatomical points (310-4, 310-7) to form arm portions of the skeleton (312). Similarly, hip anatomical points (310-8, 310-11) can be joined to respective knee anatomical points (310-9, 310-12) and respective ankle anatomical points (310-10, 310-13) to form leg portions of the skeleton (312).

Other anatomical points (310) may also be joined such as a neck anatomical point (310-1) to both hip anatomical points (310-8, 310-11) and to both shoulder anatomical points (310-2, 310-5) as well as the nose anatomical point (310-18).

The facial points may also be connected. Specifically as depicted in FIG. 3B, the right ear anatomical point (310-16)

may be connected to the right eye anatomical point (310-14), which may be connected to the nose anatomical point (310-18), which may be connected to the left eye anatomical point (310-15), which may be connected to the left ear anatomical point (310-17). Thus a general skeleton is generated for the person. Note that as the skeleton (312) is based on the identification of particular anatomical points within the image (FIG. 3A, 308), the skeleton may be robust against different poses and orientations of the person in the image.

In some examples, the anatomical points (310) may be tracked in real-time. For example, in a video the person may be walking which causes the joint locations in the legs to move as well. The movement may be tracked such that a resulting frame and spatial gradient map moves as well.

After forming the skeleton (312), a frame (314) for the person may be generated as depicted in FIG. 3C. The frame (314) further identifies those areas of an image (FIG. 3A, 308) that pertain to the person. For example, a torso region is defined which encompasses those pixels found within that region. The torso region is formed by generating a polygon with the right shoulder anatomical point (FIG. 3B, 310-2), left shoulder anatomical point (FIG. 3B, 310-5), right hip anatomical point (FIG. 3B, 310-8), and the left hip anatomical point (FIG. 3B, 310-11) as its apexes. Any pixel within this polygon can positively be identified as a part of the person portion of the image (FIG. 3A, 308).

A head region of the frame (314) may also be formed. The head region is an oval that is generated based on certain anatomical points (FIG. 3B, 310). The anatomical points (FIG. 3B, 310) used to define the region are dependent upon the direction of the head and the size of the oval is dependent upon the distance between the selected facial anatomical points (FIG. 3B, 310). Specific examples are presented below in connection with FIGS. 4-6.

With the frame filled out, a spatial gradient map (316) is generated. FIGS. 3D-3F depict various examples of spatial gradient maps (316). As described above, those pixels that are closest to the frame (FIG. 3C, 314) are those most likely to be a part of the person as compared to the rest of the pixels in the image (FIG. 3A, 308). Accordingly, the spatial gradient map (316) may indicate this likelihood via a shading as indicated in FIGS. 3E and 3F. For example, as depicted in FIG. 3F, the frame (FIG. 3C, 314) may be depicted as a white color representing those pixels known to constitute part of the person. Those nearest the frame (FIG. 3C, 314) are white and gradually decrease intensity until those that are a threshold distance away from the frame (FIG. 3C, 314) are depicted as black pixels, which indicate a low degree of likelihood of being part of the person. The spatial gradient map (316) is depicted in FIG. 3D as arrows going away from the frame (FIG. 3C, 314), the arrows indicating a reduction in intensity along the arrow direction. Thus, as depicted in FIGS. 3D-3F, the spatial gradient map (316) identifies those locations, i.e., those near the frame (FIG. 3C, 314) that are most likely to form part of the person. This spatial gradient map (316) can be used to exclude pixels that would otherwise be associated with the person and may include pixels that would otherwise be excluded from association with the person portion of the image.

For example, it may be the case that certain pixels near a user's leg may be excluded from association with the person portion based on a lack of contrast between these certain pixels and the associated background. However, using the spatial gradient map (316), which indicates these pixels as being in a range of the frame (FIG. 3C, 314), these pixels may be classified as pertaining to the person portion of the image (FIG. 3A, 308). By comparison, it may be the case that certain pixels away from a users head may be classified as part of the person portion notwithstanding their distance from the actual person portion of the image (FIG. 3A, 308). Such a misclassification may occur based on a shared pixel color value. However, using the spatial gradient map (316), which indicates these pixels as being outside of the predetermined range of the frame (FIG. 3C, 314), these pixels may be classified as not pertaining to the person portion of the image (FIG. 3A, 308). Note that the distance of the spatial gradient map (316) as depicted in FIGS. 3D-3F may be selected by a user depending on a desired resolution, or quality, of the segmentation.

In another example, the spatial gradient map (316) may be based on a distance between certain anatomical points (FIG. 3B, 310). For example, it may be the case that all pixels included in the frame (FIG. 3C, 314) may be identified with a certain gradient value, in this example white, which may have a gradient value of "1" assigned and each pixel not included in the frame (FIG. 3C, 314) may be identified with another gradient value, in this example black, which may have a gradient value of "0" associated with it. To generate the spatial gradient map (316), each non-frame pixel's gradient value is updated based on a reference distance. In this example, a distance between facial features may be used to determine a reference distance. As will be described in connection with FIGS. 4-6, the facial features may be either an eye-ear pair, an eye-eye pair, or a nose-neck pair. The distance between eye anatomical points (FIG. 3A, 310-14, 310-15) may define a reference distance, $D_{reference}$.

Accordingly, for each non-frame pixel within the threshold distance, i.e., each black pixel less than the reference distance away from the frame (FIG. 3C, 314), its value is updated by a gradient value, p, which is determined based on this reference distance. For example, the gradient value may be determined by the following equation:

$$p = e^{-\frac{D}{2 \cdot D_{reference}}}$$

In this equation, p expresses the gradient value of the pixel and D expresses a distance between the pixel and the person. In this example, D is calculated using the following equation $$D = \min\{D_{head} - D_{reference}, D_i\}, i = 1, 2, 3, \ldots$$

In this equation, $D_{head}$ expresses a distance from the pixel of interest to the center of the head region, and $D_i$ expresses a distance from the pixel to the $i^{th}$ bone. In some examples, if a vertical projection of a pixel falls on the skeleton (FIG. 3B, 312) line segment, then $D_i$ is assigned as the vertical distance between the pixel and the $i^{th}$ bone. However, if the vertical projection is not on the skeleton (FIG. 3B, 312) line segment, then $D_i$ is assigned as the distance between the pixel and the closer anatomical point. While the above has presented a specific operation to determine a gradient value for each point within the reference distance, other operations may be implemented as well, with the purpose of defining those regions near the person that are most likely to be associated with the person portion of the image (FIG. 3A, 308).

FIG. 4 depicts the formation of a front-facing head region (418) of the frame (FIG. 3C, 314), according to an example of the principles described herein. As described above, certain facial features can be used to define a head region (418) of the frame (FIG. 3C, 314). Which facial features are used is dependent upon the facing direction of the person.

For example, a head region (418) may be a forward-facing person and the anatomical points (310) to determine the head region (418) include eye anatomical points (310-14, 310-15). The determination of which direction the person is facing may be made by the pose estimator (FIG. 1, 102) which detects certain anatomical points (310). In this example, a major and minor diameter of the head region (418) may be determined based on a distance between the eye points (310-14, 310-15). This distance may be the reference distance, $D_{reference}$, mentioned above. In this example, a major diameter of the head region (418) may equal to 2.2 times $D_{reference}$, and the minor diameter of the head region (418) may be equal to 2 times $D_{reference}$. With the head region (418) defined, all pixels within this region may form part of the frame (FIG. 3C, 314) which may indicate those pixels known to be a part of the person.

FIG. 5 depicts another example of the formation of a front-facing head region (418) of the frame (FIG. 3C, 314), according to an example of the principles described herein. However, in this example, rather than using the eye-eye distance to define the head region (418), other anatomical points (310) are used to define $D_{reference}$. In this example, a nose point (310-18) and a neck point (310-1) are used to determine the head region (418). In this example, a major and minor diameter of the head region (418) may be determined based on a distance between the nose point (310-18) and the neck point (310-1). With the head region (418) defined, all pixels within this region may form part of the frame (FIG. 3C, 314) which may indicate those pixels known to be a part of the person.

FIG. 6 depicts the formation of a side-facing head region (418) of the frame (FIG. 3C, 314), according to an example of the principles described herein. As described above, certain facial features can be used to define a head region (418) of the frame (FIG. 3C, 314). Which facial features are used is dependent upon the facing direction of the person. For example, a head region (418) may be a side-facing person and the anatomical points (310) include an eye anatomical point (310-14) and an ear anatomical point (310-16). The determination of which direction the person is facing may be made by the pose estimator (FIG. 1, 102) which detects certain anatomical points (310). In this example, a major and minor diameter of the head region (418) may be determined based on a distance between the eye point (310-14) and the ear point (310-16). This distance may be the reference distance, $D_{reference}$, mentioned above. In this example, a major diameter of the head region (418) may equal to 1.4 times $D_{reference}$, and the minor diameter of the head region (418) may be equal to 1.2 times $D_{reference}$. With the head region (418) defined, all pixels within this region may form part of the frame (FIG. 3B, 314) which may indicate those pixels known to be a part of the person.

Figure 7:
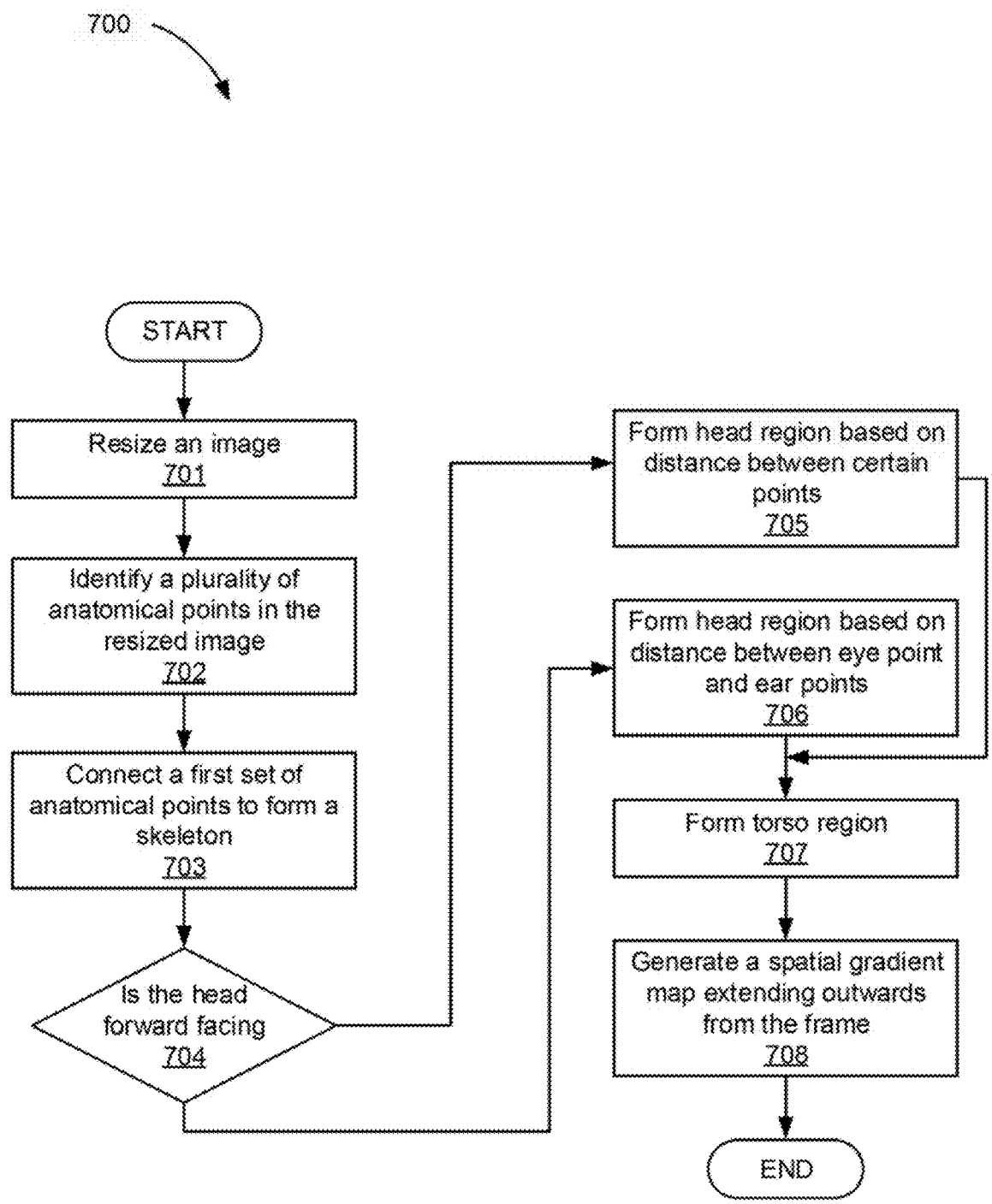
FIG. 7 is a flow chart of a method for generating a spatial gradient map for a person in an image, according to another example of the principles described herein.

FIG. 7 is a flow chart of a method (700) for generating spatial gradient maps (FIG. 3D, 316), according to another example of the principles described herein. According to the method (700) a received image (FIG. 3A, 308) is resized (block 701). That is, an image (FIG. 3A, 308) to be segmented is received at the system (FIG. 1, 100). However, in this example, prior to the generation of the spatial gradient map (FIG. 3D, 316), the image (FIG. 3A, 308) is resized (block 701). Resizing (block 701) the image (FIG. 3A, 308) may let a segmentation network operate more efficiently to learn the special information that improves the segmentation accuracy. Resizing (block 701) also reduces the calculation during spatial gradient map (FIG. 3D, 316) generation. Accordingly, identifying (block 702) a plurality of anatomical points (FIG. 3A, 310) as described above in connection with FIG. 2 may be performed as described above, but on a resized (block 701) image.

With the anatomical points (FIG. 3A, 310) identified (block 702), a frame (FIG. 3C, 314) is then formed for the person. As described above, this includes connecting (block 703) a first set of the anatomical points to form a skeleton (FIG. 3B, 312). This may be performed as described above in connection with FIG. 2.

Part of the frame (FIG. 3C, 314) process also includes forming a head region (FIG. 4, 418) for the frame (FIG. 3C, 314). As a first step, it is determined (block 704) whether the head is forward-facing or not. If the head is forward-facing (block 704, determination YES), the head region (FIG. 4, 418) is formed (block 705) based on an identified distance between eye points (FIG. 3A, 310-14, 310-15) or an identified distance between a nose point (FIG. 3A, 310-18) and a neck point (FIG. 3A, 310-1). That is, a height and width of the oval that defines the head region (FIG. 4, 418) are dependent upon a reference distance, which reference distance, in the case of a forward-facing head, is the distance between the eye anatomical points (FIG. 3A, 310-14, 310-15) or the distance between the nose anatomical point (FIG. 3A, 310-18) and the neck anatomical point (FIG. 3A, 310-1). If the head is not forward-facing (block 704, determination NO), and is therefore side facing, the head region (FIG. 4, 418) is formed (block 706) based on an identified distance between an eye point (FIG. 3A, 310-14, 310-15) and an ear point (FIG. 3A, 310-16, 310-17). That is, a height and width of the oval that defines the head region (FIG. 4, 418) are dependent upon a reference distance which reference distance, in the case of a side-facing head, is the distance between an eye anatomical point (FIG. 3A, 310-14, 310-15) and an ear anatomical point (FIG. 3A, 310-16, 310-17). Note that the reference distances in the different cases may be a different value. That is, the space between eye anatomical points (FIG. 3A, 310-14, 310-15) may not be the same as the space between an eye anatomical point (FIG. 3A, 310-14, 310-15) and an ear anatomical point (FIG. 3A, 310-16, 310-17).

To complete the frame (FIG. 3C, 314), the torso region is formed (block 707) as described above in connection with FIG. 2 and a spatial gradient map (FIG. 3D, 316) generated (block 708) extending outward from the frame (FIG. 3C, 314). These operations may be performed as described above in connection with FIG. 2.

Figure 8:
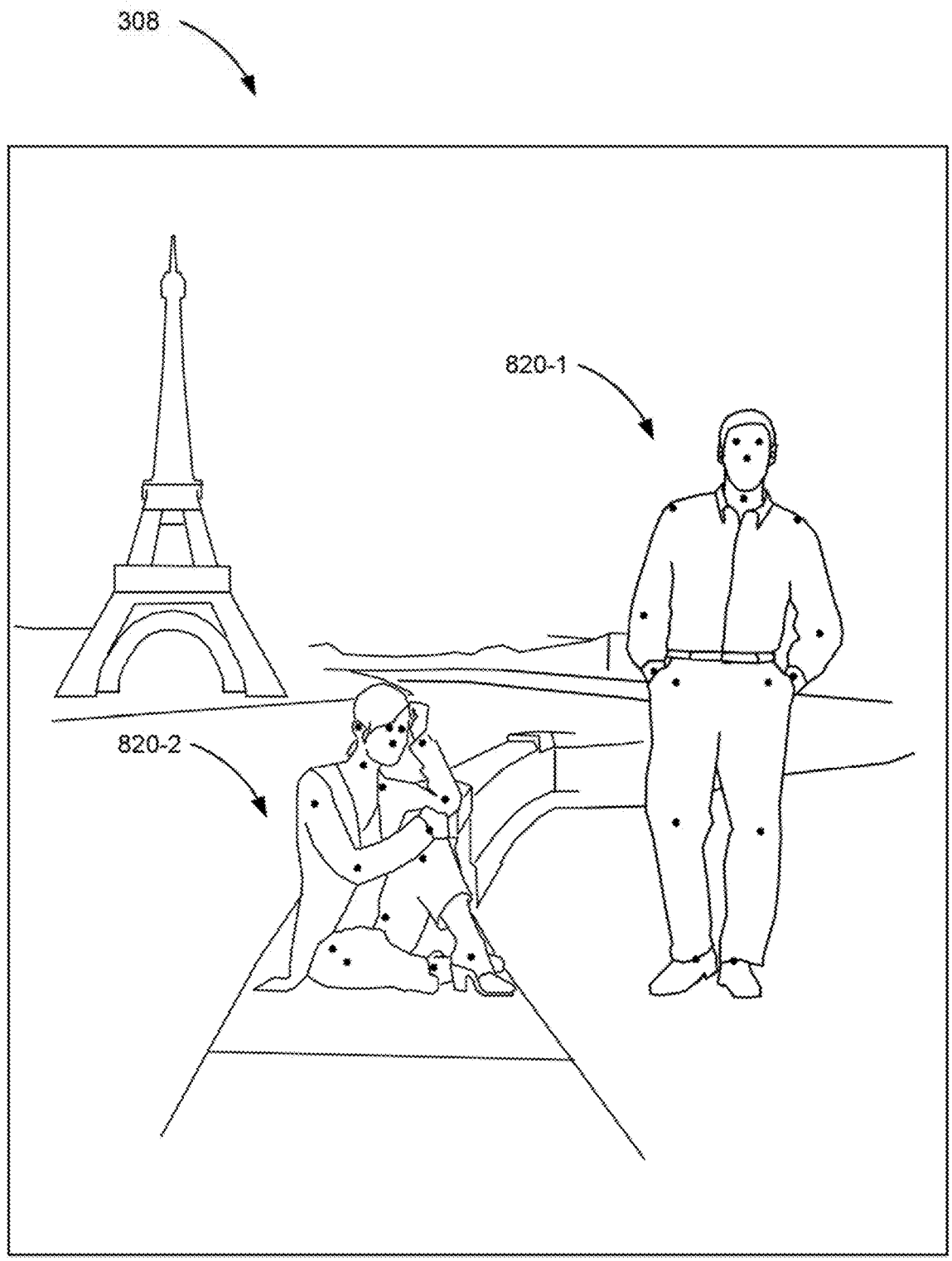
FIG. 8 depicts the identification of anatomical points for multiple persons in an image, according to an example of the principles descried herein.

FIG. 8 depicts the identification of multiple sets of anatomical points (FIG. 3A, 310), according to an example of the principles described herein. As described above, the spatial map generating system (FIG. 1, 100) operates to generate spatial gradient maps (FIG. 3D, 316) for people in an image (308). In some examples, the system (FIG. 1, 100) can do so for multiple people (820-1, 820-2) in an image (308). That is, the post estimator (FIG. 1, 102) may identify a plurality of anatomical points (FIG. 3A, 310) for multiple people (820-1, 820-2) in an image (308). Similarly, the frame former (FIG. 1, 104) generates frames FIG. 3C, 314) for multiple people (820) and the map generator (FIG. 1, 106) generates spatial gradient maps (FIG. 3D, 316) for each person (820). Note also that the operation of these components is regardless of a pose of the person (820) in the image (308). That is, the post estimator (FIG. 1, 102) may identify anatomical points (FIG. 3A, 310) on a first person (820-1) that is standing and may also identify anatomical points (FIG. 3A, 310) on a second person (820-2) that is seated.

Figure 9:
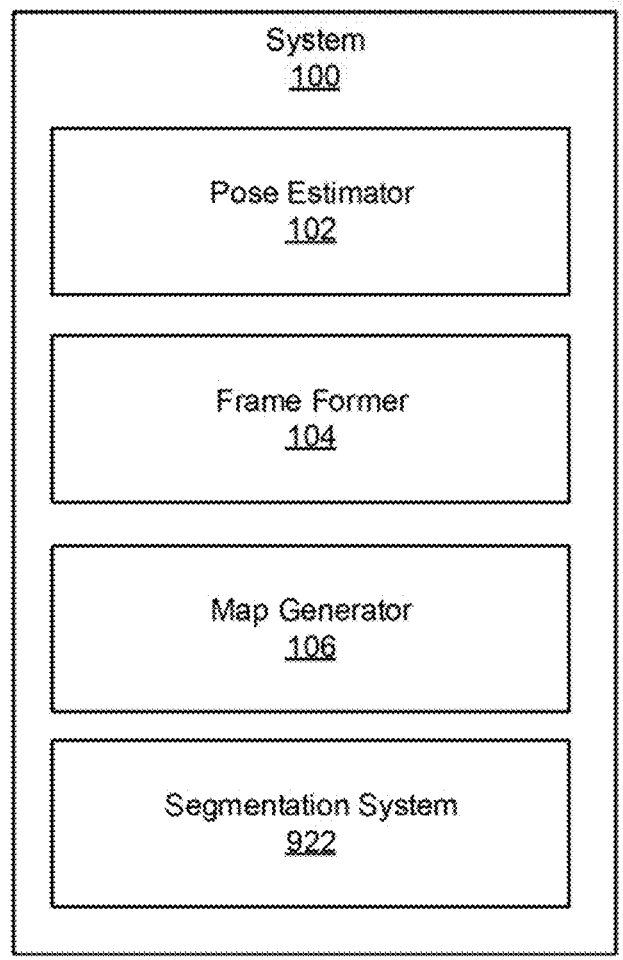
FIG. 9 is a block diagram of a system for generating a spatial gradient map for a person in an image and person segmentation, according to an example of the principles described herein.

FIG. 9 is a block diagram of a system (100) for generating a spatial gradient map (FIG. 3D, 316) and person segmentation, according to an example of the principles described herein. In this example, the system (100) includes the pose estimator (102), frame former (104), and map generator (106) as described above. That is, the pose estimator (102) identifies a plurality of anatomical points (FIG. 3A, 310) on a person (FIG. 8, 820) in an image (FIG. 3A, 308) and a frame former (104) generates a frame (FIG. 3C, 314) for the person (FIG. 8, 820). In this example, as described above, the frame former (104) may assign pixels that map to the frame (FIG. 3C, 314) a first value. The map generator (106) then, for each non-frame pixel within a reference distance from the frame (FIG. 3C, 314) determines a distance of that pixel from the frame (FIG. 3C, 314), and based on the distance assigns a value between the first value and a second value assigned to pixels of non-frame portions of the image. Thus a gradient of gradient values, or logic values is indicated, which gradient value indicates the likelihood that a particular pixel in an image pertains to the person portion or a non-person portion of the image.

In this example, the system (100) includes a segmentation system (922) which, using the spatial gradient map (FIG. 3D, 316) and other image information, separates the person (FIG. 8, 820) in the image (FIG. 3A, 308) from other portions of the image (FIG. 3A, 308). As described above, the system (100) may include four channels including three color channels and the spatial gradient map (FIG. 3D, 316). Using the three color channels certain pixels of an image may be classified as relating to a person or not. The spatial gradient map (FIG. 3D, 316) is used as a further channel to enhance the results of the segmentation when used with the three color channels. That is, since the values in the spatial gradient map express a probability of a pixel belonging to a person class, the spatial gradient map reflects the approximate position of each person (FIG. 8, 820) and the gradient values provide more spatial information to improve segmentation. Accordingly, the spatial gradient map (FIG. 3D, 316) is used along with other information to separate those pixels that correspond to person portions of the image (FIG. 3A, 308) from non-person portions of the image (FIG. 3A, 308).

In some examples, the segmentation system (922) is a machine-learning segmentation system that segments the person (FIG. 8, 820) depicted in the image (FIG. 3A, 308) from other portions of the image (FIG. 3A, 308) based on a training set of images.

In summary, using such a spatial gradient map generating system 1) provides a map from which a highly accurate person segmentation operation can be carried out; 2) generates the map based on actual pose information collected from the image; and 3) reduces segmentation error.

What is claimed is:

1. A computing system, comprising:
   a pose estimator to identify a plurality of anatomical points on a person depicted in an image;
   a frame former to generate a frame for the person by:
      connecting a first set of the plurality of anatomical points to form a skeleton; and
      forming at least a head region and a torso region based on a second set of the plurality of anatomical points; and
   a map generator to generate a spatial gradient map projecting outwards from the frame, wherein:
      the spatial gradient map is based on pixel distance from the frame; and
      an intensity along the gradient map indicates a pixels likelihood of form a part of the person.

2. The system of claim 1, wherein the pose estimator identifies the plurality of anatomical points regardless of a pose of the person in the image.

3. The system of claim 1, wherein the pose estimator identifies facial anatomical points and body joint anatomical points.

4. The system of claim 1, wherein:
   the pose estimator identifies a plurality of anatomical points on multiple persons in the image;
   the frame former generates frames for the multiple persons; and
   the map generator generates a spatial gradient map for each person.

5. The system of claim 1, wherein the pose estimator is a machine-learning pose estimator that identifies the plurality of anatomical points based on a training set of images.

6. The system of claim 1, further comprising a segmentation system to, using the spatial gradient map and other image information, separate the person in the image from other elements depicted in the image.

7. The system of claim 1, wherein the spatial gradient map has a threshold distance indicative of pixels that do not form part of the person.

8. The system of claim 7, wherein the threshold distance indicates a desired quality for a segmentation.

9. The system of claim 7, wherein the threshold distance is defined by a distance between facial features used to define the head region.

10. A method, comprising:
    identifying, in an image, a plurality of anatomical points on a person in the image;
    forming a frame for the person by:
       connecting a first set of the plurality of anatomical points to form a skeleton;
       forming a head region based on a distance between certain anatomical points on the person; and
       forming a torso region by connecting shoulder anatomical points and hip anatomical points on the person; and
    generating a spatial gradient map projecting outward from the frame, which gradient map is based on pixel distance from the frame.

11. The method of claim 10, wherein an intensity of the spatial gradient map decreases with an increase in distance away from the frame.

12. The method of claim 10, wherein:
    the head region is a front view and the certain anatomical points include eye points; and
    a major and minor diameter of an oval that defines the head region is determined based on a distance between the eye points.

13. The method of claim 12, wherein a major and minor diameter of an oval that defines the head region is determined based on a distance between the eye point and the ear point.

14. The method of claim 10, wherein:
    the head region is a front view and the certain anatomical points include a nose point and a neck point; and
    a major and minor diameter of an oval that defines the head region is determined based on a distance between the nose point and the neck point.

15. The method of claim 10, wherein the head region is a profile view and the facial anatomical points include an eye point and an ear point.

16. The method of claim 10:
    further comprising resizing the image; and identifying the plurality of key points on the person is performed on a resized image.

17. The method of claim 10, further comprising separating the person in the image from other elements depicted in the image.

18. A system, comprising:
a pose estimator to identify a plurality of anatomical points on a person depicted in an image;
a frame former to generate a frame for the person by:
   connecting a first set of the plurality of anatomical points to form a skeleton;
   forming a head region based on a distance between certain anatomical points on the person; and
   forming a torso region by connecting shoulder anatomical points and hip anatomical points on the person; and
   assigning pixels that map to the frame with a first value;
a map generator to generate a spatial gradient map projecting outwards from the frame by, for each non-frame pixel within a threshold distance from the frame:
   determining a distance from the frame; and
   based on the distance, assigning a value between the first value and a second value assigned to pixels of non-frame portions of the image;
a segmentation system to, using the spatial gradient map and other image information, separate the person in the image from other elements depicted in the image.

19. The system of claim 18, wherein the threshold distance is set by a user based on a desired quality of the segmentation.

20. The system of claim 18, wherein the segmentation system is a machine-learning segmentation system that segments the person from the image based on a training set of images.

* * * * *